UNITED STATES PATENT OFFICE.

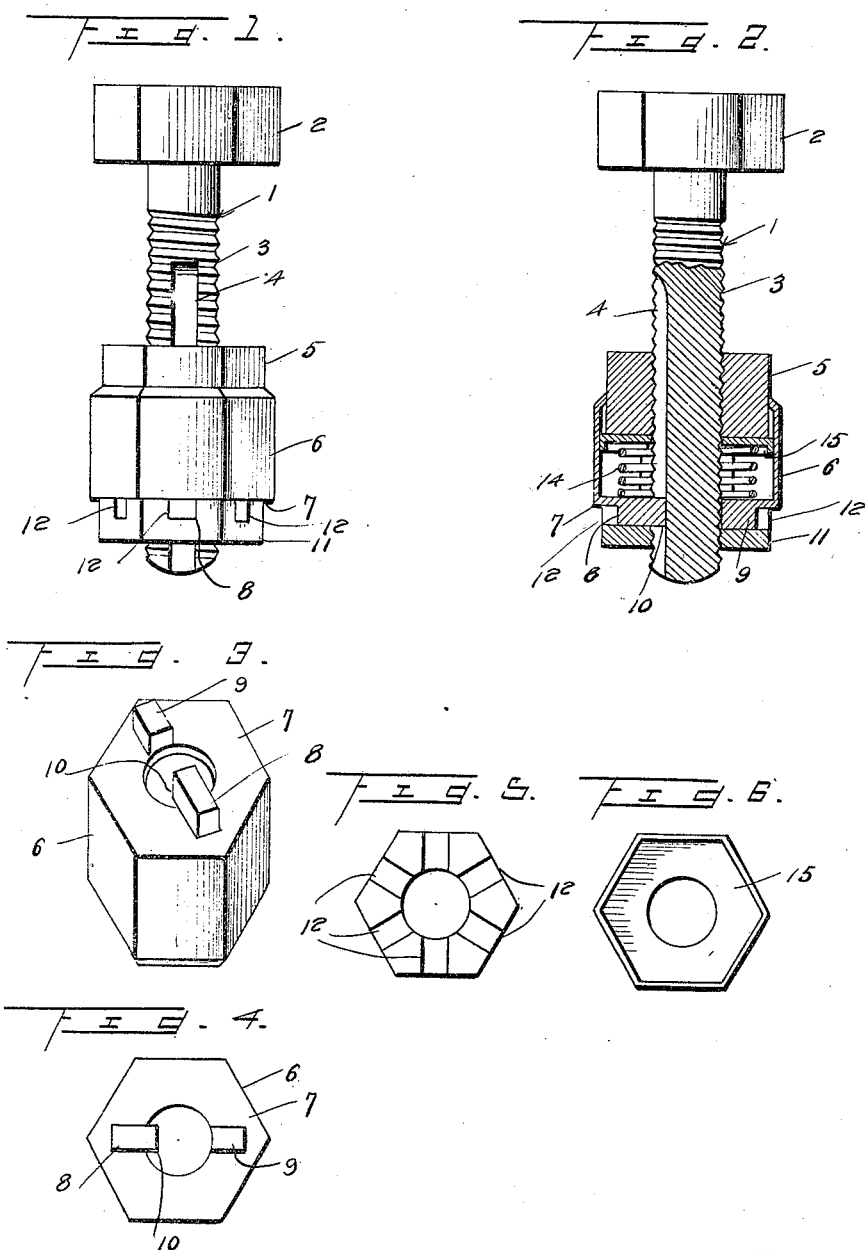

JOSEPH JERRUSS AND ALPHONSO F. FREGLY, OF PATTON, PENNSYLVANIA.

SAFETY LOCK-BOLT.

1,374,015. Specification of Letters Patent. Patented Apr. 5, 1921.

Application filed August 17, 1920. Serial No. 404,114.

*To all whom it may concern:*

Be it known that we, JOSEPH JERRUSS and ALPHONSO F. FREGLY, citizens of the United States, residing at Patton, in the county of Cambria and State of Pennsylvania, have invented certain new and useful Improvements in Safety Lock-Bolts; and we do hereby declare the following to be a full, clear, and exact description of the invention, such as will enable others skilled in the art to which it appertains to make and use the same.

This invention relates to new and useful improvements in bolt or nut locks and has for its primary object the provision of inner and outer nuts mounted for rotation on a bolt and having non-rotating tension locking means between the same adapted to slidably receive the inner nut to hold the same against rotation and to have interlocking engagement with the outer nut, thereby preventing relative rotation of the nuts in relation to each other and the bolt and providing a construction whereby manual removal of the nut may be had when desired.

Another object of this invention is the provision of a bolt or nut lock of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description and accompanying drawings, in which:—

Figure 1 is a side elevation illustrating a bolt or nut lock constructed in accordance with our invention, Fig. 2 is a vertical sectional view of the same, Fig. 3 is a perspective view illustrating a locking member, Fig. 4 is an end view illustrating the same, Fig. 5 is a plan view of an outer nut, Fig. 6 is a plan view of a washer.

Referring in detail to the drawing, the numeral 1 indicates as an entirety an ordinary bolt having a head 2 and a screw threaded shank 3 provided with a groove 4 that opens outwardly of the end of the shank 3. An inner nut 5 is threaded onto the shank 3 and is adapted to bear against the object on which the bolt is employed and is provided with the usual wrench engaging faces.

A chamber 6 is of substantially hexagonal shape to receive the inner nut 5 and has one end closed by a wall 7 provided with an opening to receive the shank 3. Oppositely disposed lugs 8 and 9 are formed on the outer face of the wall 7 and the lug 8 projects inwardly of the central opening within said wall 7 to form a projection 10 adapted to fit within the groove 4 to prevent rotation of the chamber 6 on said bolt.

An outer nut 11 is threaded on to the end of the shank 3 of the bolt 1 and is provided with the usual wrench engaging faces and has formed therein a plurality of radially extending grooves or slots 12 which are adapted to receive the lugs 8 and 9 to prevent rotation of the outer nut on the bolt. A coil spring 14 is located within the chamber 6 and bears against the wall 7 and against a washer 15 disposed against the inner nut 5 whereby the chamber 6 is normally urged in the direction of the outer nut 11 to cause the lugs 8 and 9 to engage in the radial grooves or slots 12 and thereby locking the outer nut 11 against rotation on the bolt and owing to the shape of the chamber 6 and the receiving of the inner nut 5 therein prevents said inner nut from having accidental rotation in relation to the bolt 1. When it is desired to remove the nut from the bolt, the chamber 6 is moved in the direction of the nut 5 against the tension of the spring disengaging the lugs 8 and 9 from the radial grooves or slots 12 thus permitting the nut 11 to be turned off of the bolt. After the nut 11 has been removed, the chamber 6 may be then removed with the spring and washer 15 from the bolt, leaving the nut 5 free to be turned off of the bolt.

The washer 15 is substantially hexagonal in shape to conform to the contour of the chamber 6.

While we have shown and described the preferred embodiment of our invention, it will be understood that minor changes in construction, combination and arrangement of parts may be made without departing from the spirit and scope of the invention as claimed.

Having thus described the invention, what is claimed is:

1. A nut lock including a screw threaded bolt, an inner nut threaded on said bolt, an outer nut threaded on said bolt, and tension locking means secured to the bolt and located between said nuts and receiving one of said nuts to hold the same against rotation, and having a locking connection with the other nut to prevent rotation of said nuts.

2. A nut lock including a screw threaded bolt having a groove, inner and outer nuts threaded on said bolt, a tension locking means between said nuts and engaging the groove to prevent rotation thereof in relation to the bolt, said locking means receiving one of the nuts and having a locking connection with the other nut to prevent relative rotation of the nuts in relation to each other and with the bolt.

3. A nut lock including a screw threaded bolt having a groove, an inner nut threaded on said bolt, an outer nut threaded on said bolt, a chamber interposed between the nuts and receiving the inner nut and engaging the groove to prevent rotation of the inner nut, and an interfitting connection between said chamber and the outer nut to prevent said outer nut from having rotation.

4. A nut lock including a screw threaded bolt having a groove, an inner nut threaded on said bolt, an outer nut threaded on said bolt, a chamber mounted on said bolt between the nuts and adapted to slidably receive the inner nut, means formed on said chamber and fitting within the groove to prevent rotation of said chamber on the bolt and adapted to permit said chamber to slide in relation to the bolt, an interfitting locking connection between the chamber and the outer nut, and tension means between the chamber and the inner nut.

5. A nut lock including a screw threaded bolt having a groove, inner and outer nuts threaded on said bolt, a chamber on said bolt between the nuts and slidably receiving the inner nut, lugs formed on said chamber and one of said lugs engaging the groove, said outer nut having radial grooves adapted to receive the lugs to form a locking connection between the same and the chamber, a washer located in the chamber and mounted on the bolt and bearing against the inner nut, and a spring between the washer and the chamber.

In testimony whereof we affix our signatures in presence of two witnesses.

JOSEPH JERRUSS.
ALPHONSO F. FREGLY.

Witnesses:
CHAS. GOEBORO,
LOUIS EUFUSIO.